United States Patent [19]

Lashmore et al.

[11] Patent Number: 5,603,815
[45] Date of Patent: Feb. 18, 1997

[54] ELECTROCHEMICAL FLUIDIZED BED COATING OF POWDERS

[76] Inventors: David S. Lashmore, 60 Farr Rd., Lebanon, N.H. 03766; Glenn L. Beane, RFD 3 Perch Pond Rd., Box 134, Plymouth, N.H. 03264; David R. Kelley, 2009 Tuscarora Creek Rd., Martinsburg, W. Va. 25401; Christian E. Johnson, 34 Boileau Ct., Middletown, Md. 21769

[21] Appl. No.: 317,532

[22] Filed: Oct. 4, 1994

[51] Int. Cl.$^6$ .............. C25D 17/00; C25D 5/00; C25D 7/00; B05C 3/00
[52] U.S. Cl. ............ 204/222; 205/145; 118/DIG. 5; 118/417; 118/418; 118/640
[58] Field of Search ............... 204/222; 118/DIG. 5, 118/417, 418, 640; 205/144, 145

[56] References Cited

U.S. PATENT DOCUMENTS

| | | | |
|---|---|---|---|
| 3,397,126 | 8/1968 | Gilbert | 205/145 |
| 3,428,543 | 2/1969 | Weber | 205/144 |
| 3,699,014 | 10/1972 | Eisner | 204/222 |
| 4,229,276 | 10/1980 | Kobayashi et al. | 204/222 |
| 4,606,941 | 8/1986 | Jenkin | 427/217 |
| 4,724,794 | 2/1988 | Itoh | 118/DIG. 5 |

OTHER PUBLICATIONS

D. J. Pickett, J. Appl. Electrochem., 5, (1975) (no month) pp. 101–103.
M. Fleischmann, J. Appl. Electrochem., 14, (1984) (no month) pp. 269–275.
J. K. Lee et al., J. Appl. Electrochem., 19, (1989) (no month) pp. 877–881.
N. Vatistas et al., J. Appl. Electrochem., 29, (1990) (no month) pp. 951–954.
Shi–Chern Yen et al., J. Electrochem. Soc., 138, No. 8 (Aug.–1991) pp. 2344–2348.
F. Coeuret, J. Appl. Electrochem., 10, (1980) (no month) pp. 687–696.
D. C. Carbin et al., Electrochim. Acta., 19, (1974) (no month) pp. 645–652.
D. C. Carbin et al., Electrochim. Acta., 19, (1974) (no month) pp. 653–654.
D. C. Carbin et al., J. Appl. Electrochem., 5, (1975) (no month) pp. 129–135.
D. C. Carbin et al., J. Appl. Electrochem., 5, (1975) (no month) pp. 137–143.
D. R. Gabe et al., Chemistry and Industry, 19, (Apr. 19, 1975) pp. 335–336.
Mehrdad R. Kalantary et al., Inst. of Poly. Tech. and Materials Engineering, 67, No. 24, (1989) (no month) pp. 24–27.
Mehrdad R. Kalantary et al., Inst. of Poly. Tech. and Materials Engineering, 67, No. 28, (1989), pp. 28–30 (no month).
C. P. S. Johal et al., Inst. of Poly. Tech. and Materials Engineering, 67, No. 31, (1989), pp. 31–34 (no month).
B. J. Sabacky et al., J. Electrochem. Soc., 126, No. 7, (1979) (no month) pp. 1176–1187.
D. S. Coleman et al, Powder Metallurgy, 32, No. 1, (1989) (no month) pp. 35–40.
F. Goodridge et al., Electrochim. Acta., 24, (1979) (no month) pp. 1237–1242.

(List continued on next page.)

*Primary Examiner*—Bruce F. Bell
*Assistant Examiner*—Edna Wong
*Attorney, Agent, or Firm*—Leydig, Voit & Mayer

[57] ABSTRACT

A method for coating particulate substrate materials is provided which comprises (a) combining particles and an electrolyte in an imperforate container; (b) vibrating the container to generate a fluidized bed of particles in the electrolyte; and (c) electrochemically depositing a coating on the particles from reactants in the electrolyte. An apparatus for coating particles is also provided which comprises an imperforate container for receiving particles to be coated and an electrolyte and a device for generating a fluidized bed in the container, the device being operatively associated with the container.

4 Claims, 9 Drawing Sheets

OTHER PUBLICATIONS

Derek Pletcher et al., "Industrial Electrochemistry", publ'd by Chapman and Hall, London–New York, pp. 163–166 and 350–354 (no date).

C. O. Emenike, Materials & Design, 13, No. 4 (1992) (no month) pp. 215–219.

L. Cifuentes et al., J. Appl. Electrochem., 13, (1983) (no month) pp. 325–335.

F. W. Salt, Inst. of Chemical Engineers, "The Electrodeposition of . . . Stainless Steel Powder", London, England, pp. 1–5 (no date).

Bernard J. Wood et al., Surface and Coatings Technology, 49, (1991) (no month) pp. 228–232.

M. Alonso et al., Powder Technology, 63, (1990) (no month) pp. 35–43.

M. Satoh et al., Powder Technology, 70, (1992) (no month) pp. 71–76.

Keiichi Tsugeki et al., J. of Materials Science, 28, (1993) (no month) pp. 3168–3172.

Bernard J. Wood et al., Surface and Coatings Technology, 49, (1991) pp. 228–232 (no month).

T. Kimura et al., Journal de Physique IV, 1, (Sep. 1991), pp. 103–110.

Brian E. Williams et al., The Minerals, Metals & Materials Society, (1991), pp. 95–101 (no month).

Shigeharu Morooka et al., Powder Technology, 63, (1990) (no month) pp. 105–112.

Robert E. S. Arndt et al., Technical Paper FC74–572, Society of Manufacturing Engineers (SME) 1974, pp. 1–12 (no month).

Masahiro Uda et al., Powder Metallurgy Science & Tech., 2, No. 2, (Jan. 1991) pp. 38–42.

Jacob J. Stiglich et al., Ceram. Eng. Sci. Proc., 12, (1991) pp. 1958–1966.

M. R. Kalantary et al., Circuit World, 15, No. 4, (1989) (no month) pp. 39–42.

S. A. Amadi et al., J. Appl. Electrochem., 21, (1991) (no month) pp. 1114–1119.

S. A. Amadi et al., Trans. IMF, 72, No. 1, (1994) (no month) pp. 45–54.

S. A. Amadi et al., Trans. IMF, 72, No. 2, (1994) (no month) pp. 66–71.

Uziel Landau et al., Plenum Press, Case Institute of Technol., pp. 61–72 (no date).

K. A. Spring et al., J. Appl. Electrochem., 15, (1985) (no month) pp. 609–618.

1 page color brochure, "The oscillant unit", osci galvano s a I. Kimura et al., Nippon Seramikkusa Kyokai Gakujutsu Ronbunshi, 97, (1989) (no month), pp. 1525–1529.

ELECTROCHEMICAL FLUIDIZED BED COATING OF POWDERS

BACKGROUND OF THE INVENTION

1. Technical Field

The present invention combines a fluidized bed apparatus with electrochemical deposition of coatings on metal, alloy, polymer, and ceramic materials, thereby completely and uniformly coating a wide variety of materials. More particularly, the invention provides a method and apparatus for coating particulate substrates resulting in coated particles useful in applications requiring enhanced thermal properties and in applications where coated particulates provide advantages in consolidation.

2. Description of Related Art

Several industrially accepted techniques of coating materials with metals or alloys exist. These techniques include (1) immersion deposition, wherein coating occurs by immersion of an object in an electrolyte solution without application of an external current, and where the coating metal or alloy is more noble than the material being coated; (2) electrolytic fluidized bed deposition, wherein a bed of material to be coated is itself fluidized by pumping an electrolyte solution through the bed; (3) autocatalytic deposition, which requires a catalyst and a reducing agent; (4) dry fluidized bed deposition, wherein coating is accomplished by chemical or physical vapor deposition; and (5) mechanical plating, wherein both the metal coating and the material to be coated are powders, and physical means are used to coat the powders by impacting one metal onto another.

All of these techniques have significant disadvantages for coating particulate substrate materials, particularly in the areas of yield, flexibility, cost, process control, and coating thickness uniformity. For example, immersion deposition powder coating is restricted to specific situations where the coating metal or alloy is more noble than the substrate being coated. In addition, the composition of the electrolyte solution changes significantly with time so that the morphology of the coating also changes with time. Furthermore, with immersion deposition, certain sites remain uncoated on the surface of the substrate and impurities are often undesirably incorporated into the coating.

Electrolytic fluidized bed deposition as commonly practiced operates by pumping an electrolyte through a bed of particles or by passing the entire bed of particles across a cathode plate. This pumping process results in a solution of particles in which the particles are not in intimate contact and are undesirably dispersed. In other words, a less than ideal density of the fluidized bed is created as there is diminished particle to particle contact, as well as diminished particle to cathode contact. This results in a significant disadvantage in using this technique because a very high number of contacts are being continually made and broken, producing non-uniform distribution of charge. This latter phenomenon also results in large variations of potential distribution so that, in some parts of the bed, anodic reactions occur while in other parts cathodic reactions of differing potential occur, resulting in differing morphology or alloy compositions being deposited. Another disadvantage is that many metal/alloy combinations cannot be uniformly coated and control over the process is not precise.

Autocatalytic deposition is an aqueous electrochemical process in which the electrons required for the reduction reaction are provided by a reactant which itself is oxidized in the solution employed. No external current flows into the system and often the oxidized species is incorporated into the deposit. Autocatalytic deposition requires that the surface of the substrate be treated with a suitable catalyst such as platinum, palladium or tin and that a reducing agent such as formaldehyde, sodium hypophosphite, or sodium borohydride be present within the electrolyte. Examples of autocatalytic deposition are systems involving the metal-metalloids, such as nickel phosphorus, cobalt phosphorus, cobalt tungsten-phosphorus, or carbon containing metals such as copper, silver, and gold. In the metal-metalloid system, a sodium hypophosphite electrolyte is typical while in the copper system, a formaldehyde electrolyte is typical.

Autocatalytic deposition, however, has several disadvantages. First, most autocatalytic deposition processes result in the formation of an alloy coating around the particle being plated (hydrazine-containing systems are a notable exception). This alloy coating contains reaction products usually resulting from the reducing agent. For example, in the case of sodium hypophosphite, phosphorus is commonly incorporated into the coating to yield an alloy in which undesirable inclusions of phosphorus are present. In the case of copper, an undesirable carbon-copper alloy results from undesirable inclusions of carbon when a formaldehyde electrolyte reducing agent is used. These inclusions compromise the purity and uniformity of the resulting alloy coating as well as the properties of such materials.

The incorporation of almost any reaction product as an undesirable inclusion in the coating will generally have some effect on all of the properties of the coated particles. These undesirable inclusions have an adverse effect on the properties, particularly thermal properties, of the coated particles, particularly carbon inclusions in copper coatings.

The undesirable inclusions increase the electrical resistivity of the coated material, decrease the density, decrease the ductility, affect the melting point, and, most dramatically, decrease the thermal conductivity. Moreover, upon thermal treatment, the inclusions typically can cause undesirable phase changes. In the case of carbon impurities in copper coatings, the carbon-containing organic molecules expand and cause a significant density change. In the case of nickel (or cobalt) with phosphorus impurities, thermal treatment results in the formation of intermetallics such as $Ni_3P$.

Furthermore, autocatalytic deposition requires that a catalyst such as platinum, palladium or tin be adsorbed on the surface of the substrate. The presence of this catalyst further compromises the uniformity and purity of the final coated material. Also, the use of catalytic agents, particularly on particles with very high surface area to weight ratios, tends to make the electrolyte quite unstable in the sense that the entire system can spontaneously decompose. Furthermore, in the case of platinum and palladium, the catalytic agent is expensive, particularly when adsorbed on substrates with high surface areas.

In addition, autocatalytic deposition is limited in terms of the different metals which can be used for coating. Autocatalytic deposition is possible for some of the more common metals used as coatings such as Cu, Ni, Co, Ag, Au, Sn, Zn, Pd, Ru, and Fe. However, in most cases undesirable inclusions of carbon, phosphorus, or boron impurities remain in the coating.

Finally, not only are autocatalytic deposition processes typically quite expensive and inconvenient to use because of the chemicals required (Pt, Pd, etc.), but also because of the high temperatures used, the required degree of control, and the required ventilation.

The most significant disadvantage of chemical vapor deposition (CVD) of metals onto dry fluidized beds is the limitation of suitable substrate/coating combinations. For example, low melting point substrates cannot be used given the elevated temperatures involved in many CVD processes. Another disadvantage is that gas phase reactions occur which result in undesirable inclusions being incorporated into the coating, compromising its uniformity. The coating process of this technique is also difficult to control and often involves relatively high cost.

Mechanical plating of powders, while usually a low cost process, has the disadvantage of being restricted for applications using larger powder sizes. Furthermore, this technique requires the presence of an inert hard species which kinetically impacts the coating media as it is pressed into or onto the powder being coated. This necessarily results in the mechanical deformation of the powders and control of the process is difficult.

Physical blending or mixing of particles also poses significant disadvantages. If, for example, powders of copper and tungsten were simply physically mixed prior to compaction, the blending would be far from uniform. The reason for this is the different densities of copper and tungsten. In addition to density, differences in aspect ratio, roughness, or size will often result in segregation during blending. In fact, almost any discernible difference between powder types will result in segregation and some non-uniformity during the blending process. As a result of the non-uniformity of the composition and the concomitant lack of uniformity of properties, these composite powders frequently do not meet performance specifications. This failure to meet specifications within a high degree of accuracy is extremely important when large numbers of articles are manufactured and each one is critical to the performance of a larger device.

Thus, there is a need for a process to uniformly and completely coat particulate substrates with metals and alloys such that the final coated product does not contain undesirable inclusions which detrimentally affect its purity, its structural integrity at high temperatures, or its physical properties, including resistivity, density, ductility, and particularly its thermal diffusivity. It is also desirable for the coating thickness to be accurately controlled and for the coating process to be useful in applications using a wide variety of substrate materials.

In addition to the formation of coated particles with enhanced thermal properties, the present invention may find application in the area of dental restoration. Dental practitioners commonly employ silver-tin alloys and related intermetallic compounds as dental amalgam preparations for use in dental restorations such as fillings and prostheses. The typical amalgamation reaction uses elemental mercury as the liquid sintering agent in combination with the silver-tin alloy. However, certain mercury phases which constitute a network holding the amalgam together are susceptible to corrosion with concomitant release of elemental mercury and mercury-containing compounds.

Thus, in terms of dental restoration techniques, the accepted method of using mercury (and copper) amalgams presents two main disadvantages. First, the potential for mercury leaking from improperly formed amalgams and through corrosion presents mercury poisoning hazards to those exposed to such amalgams, such as patients treated with amalgams in dental applications. Second, the accumulation of toxic metals, namely mercury, in local sewage systems purportedly from dental office waste disposal of dental amalgams has raised public health concerns. Because of the possibility of mercury poisoning of the patient and the difficulties in disposal of mercury-containing amalgams, it is desirable to form less toxic alternatives to mercury amalgams for dental restoration applications. Health concerns mandate and, in the United States, Congress may require alternate mercury-free dental restoration materials.

Electrolytic fluidized bed reactors have been used to remove trace metals from industrial process waste streams. Such reactors have primarily been applied for removal of trace amounts of copper. In these fluidized bed systems, the bed of powders onto which the trace metals deposit is fluidized by flowing the electrolyte solution through the bed of powders. Often the cathode compartment is separated from the anode compartment by a membrane, such that separate catholyte and anolyte solutions exist. It is the catholyte solution which is being purified. While these systems may be effective in removing trace amounts of copper from waste streams, such systems have not found widespread applicability for use in coating a variety of substrate materials with uniform coatings.

SUMMARY OF THE INVENTION

The coating method of the present invention provides uniform and completely coated particulate substrate materials. The particulate substrate to be coated is immersed in an electrolyte within an imperforate coating container, which may also be electrically conductive. As defined and used herein, an electrolyte includes a solution in which compounds are dissolved in a fluid, preferably aqueous, organic, and/or molten salt. A fluidized bed of the particles in the electrolyte is then generated in the container. While fluidized, the particles are electrochemically coated. The desirable properties of the coated particles of the present invention result from the method of coating particulate substrates which employs a uniquely designed coating container and procedure for establishment of the fluidized bed.

The present invention provides a fluidized bed coating apparatus, preferably of an electrochemical type, whereby particulate substrates behave as a fluidized bed of particles. The particulate substrates can be any shape, including irregular shapes, fibers, etc. Preferably the particles are spheroidal and most preferably spherical. The particulate substrate's particle size has no upper limit, although preferably the particles range in size from about 2.5 microns to about 0.5 millimeter. Fluidization of the particles enhances mass transport of reactants in the electrolyte to the surface of the particles being coated. In addition, in the present system, fluidization maintains substantial electrical contact between the particles and the cathode plate during cathodic deposition so that the electrochemical reaction predominating is reduction.

Formation of a fluidized bed of particles (or fluidization of the particles) may occur concurrently with electrochemical deposition. The particulate substrate is placed in a container that in a preferred embodiment is attached to an actuator which is associated with a transducer. The transducer simultaneously provides angular and/or linear mechanical agitation of the container, generating a fluidized bed of the particles contained therein. If the container is circular, the motion of the particles is rotational about the center axis of the container, while if the container is rectangular, the motion of the particles is translational. The container, being a component of the electrochemical deposition cell, may operate as the cathode contact during certain deposition processes where an external electric potential is applied. For such applications, the container is electrically conductive. Since the container is imperforate, loss of the particulate substrate during deposition to the bulk electrolyte into which the particles and coating container are immersed is substantially eliminated.

The container which holds the particulate substrate is constructed to facilitate generation of the fluidized bed and prevent agglomeration of the particles during the coating process. In a circular container, a recessed annular pathway is provided around which the fluidized bed of particles moves. The annular pathway may also include a series of sloped, stepped segments, the segments being arranged about the perimeter of the container. In a rectangular container having similar segments, the segments extend along the length of the container. During fluidization, the particles continually move up the sloped, stepped segments, falling over the top edge of the sloped segment on which it has ascended onto the lowest part of the next abutting segment.

The constant fluidized motion of particles in the fluidized bed thus prevents or minimizes agglomeration of the particles during coating and enhances mass transport of the reactants in the electrolyte to the reacting surface of the particles. In addition, the present invention involves a non-pressurized system such that a pressure differential across the fluidized bed is not created. In other words, the fluidization of the particles does not involve pumping the electrolyte through the bed in order to fluidize the particles. As a result, the fluidization of the particles according to the present invention creates a bed which is much more dense than where the fluid is pumped through the bed of particles. The increased density of the fluidized bed in the present invention results in the particles maintaining substantial electrical contact and acting essentially as cathodes continuously during deposition. All of these factors combine to provide for more uniform coating of the particulate substrate such that the coating thickness is substantially constant regardless of the surface contours or irregularities of the particles.

Another important aspect of this invention is to provide a method for uniformly and completely coating a wide variety of particulate substrates such as metal, alloy, polymer, and ceramic materials, using this electrochemical fluidized bed apparatus. The coated particles are substantially free from unwanted inclusions or contaminants, catalysts, and reducing agents which typically compromise the purity, uniformity, and structural integrity, particularly at high temperatures, of coated particulates produced by conventional particulate coating methods.

The coating method of the present invention for uniformly coating particulate substrates generally involves immersing the particulate substrate, which is placed in an imperforate container, in an electrolyte. The container, which may be electrically conductive, holds the particles during the coating process. The electrolyte may be added directly to the container, or, preferably, the container holding the particles is immersed in the electrolyte which is contained in a larger receptacle so that the particles, and preferably the container, are completely immersed in the solution.

After immersion of the particulate substrate in the electrolyte, a fluidized bed of the particles is created by vibrating the container. The fluidized bed may be generated by an actuator, associated with a transducer, all of which are operatively associated with the coating container holding the particles. The constant motion of the fluidized bed of particles minimizes or eliminates agglomeration of the particles during the deposition process and provides a dense bed of fluidized particles maintained in intimate contact with each other and with the container.

The particulate substrate material forming the fluidized bed of particles is then coated. The coating process may be accomplished by electrochemical deposition which encompasses electrolytic, immersion, and electrophoretic deposition processes. Electrolytic deposition involves application of an external electric potential to the system during the coating process, while immersion deposition involves electrochemical coating when no external electric potential is used. Electrophoretic deposition in the present invention involves migration of suspended or colloidal charged particles which coat substrate particles due to the effect of a potential difference. Electrolytic deposition is preferred and is expected to be the primary application in the present invention.

Electrolytic deposition typically occurs by reduction of metal ions in the electrolyte and coating of the reduced reagents onto the surface of the particles of the fluidized bed. Here, an external electric potential is applied to the system and the coating container into which the particulate substrate material is placed and which operates as the cathode contact. The container is conductive and is made from any material that does not substantially react with the electrolyte. The anode may be any conductive material commonly used in electrochemical deposition reactions. The application of the external electric potential (or current) continues until the desired coating thickness on the particulate substrate has been achieved.

Following the electrochemical deposition process, the coated particles are separated from the electrolyte by filtration or decantation, rinsed with water, preferably deionized or distilled water, and then dried.

Depending on the application, once the particulate substrate has been electrochemically coated using the fluidized bed process described above, the coated particles may be compacted to form a fabricated part. This compaction can be accomplished by known powder metallurgy techniques. The coated powders may be compacted alone or in combination with other powders, coated and uncoated, of varying particle sizes, to form the desired shaped part.

The method and apparatus described herein provide for the formation of coated particulate materials with enhanced thermal properties, namely high thermal diffusivities and coefficients of thermal expansion tailored to a particular application. An example of such a material is tungsten coated with copper. Tungsten has a thermal diffusivity somewhat less than that of copper as well as a low coefficient of thermal expansion. By appropriate coating, engineering materials can be formed having desirable intermediate thermal properties and coefficients of thermal expansion.

Another application of the coated particulate materials is in the area of dental restorations. A particular advantage of the coated materials of the present invention is the creation of mercury-free dental restorations. Examples of these restorations include silver coated tin and silver coated intermetallics such as $Ag_3Sn$ and $Ag_4Sn$, which can be pressed into dental cavities with commonly used dental instruments.

This invention additionally provides for a method whereby substances are removed from a waste stream by passing the waste stream across or through the fluidized bed of particles. In such a treatment technique, a continuous process is particularly effective. The substances are selectively removed from the waste stream through deposition onto the particulate material of the fluidized bed as the waste stream contacts the bed during processing. This is expected to have widespread application to the removal of trace metals from waste streams, in particular, the removal of copper. Once removed from the waste stream, such metals can be reclaimed from the coated particles by known methods.

In addition to materials with enhanced thermal properties and mercury-free dental restorations discussed above, the method and apparatus of the present invention provide coated particulate substrates with a number of other advantages over materials prepared by known coating methods. First, because each particle is completely coated, the coating itself acts as a spacer to keep original substrate particles from contacting each other. For example, in copper coated tungsten, complete copper shells surround each tungsten particle, thus providing improved thermal diffusivity.

Another advantage using the coating method and apparatus described herein that could not be achieved from mixing or blending particles of different compositions is the extraordinary degree of compositional uniformity attained. The blending process most always introduces regions of local inhomogeneity in the composition that is completely avoided by the coating process of the present invention. When the coated particles are subsequently compacted, no segregation of components of different densities occurs as would likely occur if, for example, powders of tungsten were simply blended with powders of copper before compaction.

An additional advantage of the coating method and apparatus of the present invention is the displacement and replacement of tenacious oxides (i.e. layers of oxides which are difficult to remove) on the surfaces of many of the particulate substrates being coated. This reduces the final oxide content of the final coated product. In the case of aluminum and titanium powders, for example, thin coatings of copper and nickel may replace any surface oxides present. The removal of the oxide layer provides an advantage in subsequent processing steps where shaped parts are formed by compaction or consolidation.

In addition, the coating method and apparatus of the invention allow for accurate control of the volume ratio of the metal coating to the particles to be coated. For materials designed for thermal management, such as copper coated tungsten or copper coated silicon carbide, this is an important characteristic of the coating process.

This invention provides for the fabrication of net shaped articles that were previously either impossible or too costly to produce because of the unavailability of appropriate coating techniques and apparatus. Examples of such products include, but are not limited to, shaped memory alloys, unique n-type semiconductors, protective coatings for reactive metals, materials with tailored or engineered thermal coefficients of expansion and good thermal diffusivity, intermetallics for use in dental applications, and materials with special magnetic properties such as unique magnetic signatures. The above list is a representative sample of applications using the present invention and is not intended to be limiting or exhaustive.

DESCRIPTION OF THE PREFERRED EMBODIMENTS

Figure 1:
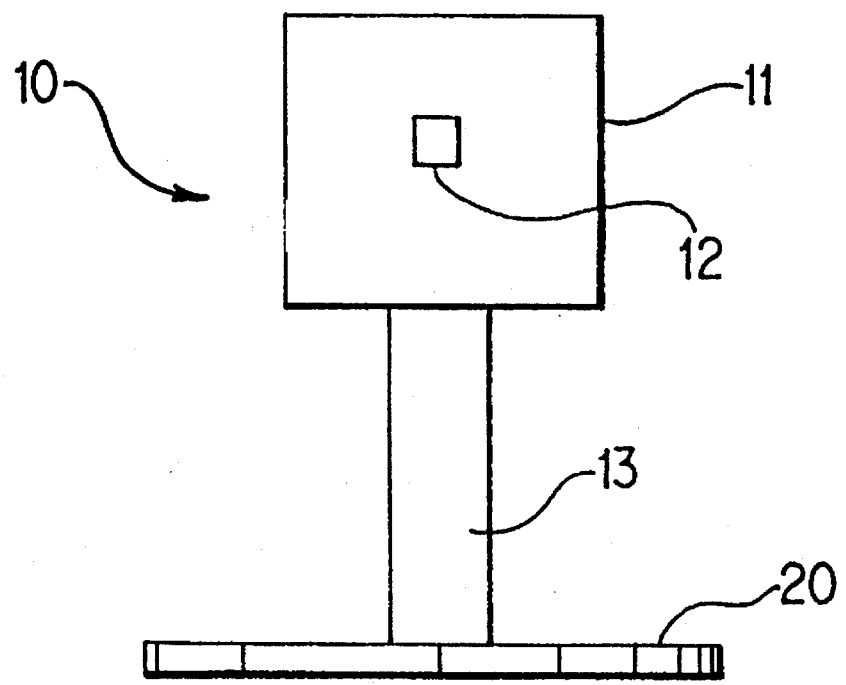
FIG. 1 is a side schematic view of the vibratory device of the present invention which generates a fluidized bed of material, consisting of an actuator associated with a transducer attached through a shaft to a fluidized bed container, which may also serve as the cathode contact during electrochemical deposition.

The particulate substrates coated by the method and apparatus of this invention comprise any material which can be effectively dispersed in a fluidized bed apparatus as described herein. These particulate substrates may be powders, small fibers, or other particulate materials, with powders being preferred. Although the particulate substrates can be any shape, including irregular shapes, the particles are preferably spheroidal in shape, spherical particles being most preferred. The particulate substrates must be sufficiently conductive so that electron transfer from the cathode container through the fluidized bed of material can take place. Thus, the particulate substrate may be either a conductor or a semiconductor. Typical of materials which are suitable for use as particulate substrates are those having resistivities in those ranges categorized by texts devoted to semi-conductors (such as *Semiconductor Devices, Physics and Technology*, John Wiley & Sons, N.Y., N.Y., page 1, 1985) as being semiconductors or conductors. This includes materials having resistivities less than about $10^5$ ohm-cm. The particulate substrates envisioned in the present invention include a wide variety of metal, alloy, polymer, and ceramic powder particles. The particles may include, for example, metals and metal alloys including, but not limited to, W, Sn, Cu, Ti, Al, and Fe, intermetallics such as $Ag_3Sn$ and $Ag_4Sn$, inorganic oxides such as alumina, ceramics such as silicon carbide, polymers, and various forms of carbon including diamond and graphite.

The particulate substrates to be coated are selected according to the desired application and properties sought. For applications requiring materials with enhanced thermal properties, the particulate material preferably consists of tungsten or silicon carbide powder particles. For example, if the desired application is to create materials used for thermal management where the thermal diffusivity and the coefficient of thermal expansion are required to be carefully engineered, the starting material is preferably a material such as tungsten metal or silicon carbide particles. Both of these materials have low coefficients of thermal expansion and thermal diffusivities somewhat less than that of copper, the metal typically used for coating. Alternatively, the starting material might be graphite or diamond for such applications. If the desired application relates to materials which may be used in direct dental restorations, the starting material is preferably a material such as tin metal or an intermetallic such as $Ag_3Sn$ or $Ag_4Sn$.

No upper limit as to the average particle size of the particulate substrate is envisioned; however, larger particle sizes may compromise the formation of a fluidized bed of particles. Preferably, the average particle size of the particulate substrate can range from about 2.5 microns to about 0.5 millimeter. Most preferably, the average particle size ranges from about 10 microns to about 0.1 millimeter.

Lighter materials (that is, those that are less dense) may have particle sizes ranging from about 15 microns to about 0.5 millimeter. The lower limit on particle size is established by the fact that very small particles tend to float due to buoyancy and to competition between viscous forces and gravitational forces. The lower limit of particle size may possibly be extended below that given above by the addition to the electrolyte of appropriate surface active agents. Any surface active agent employed should in no way interfere with any of the reactions or steps involved in the coating process or in the products formed thereby. Exemplary of such a surface active agent is ammonium nitrate which will adsorb on the surface of the particles and serve to electrostatically attract the particles to the cathode.

Figure 7:
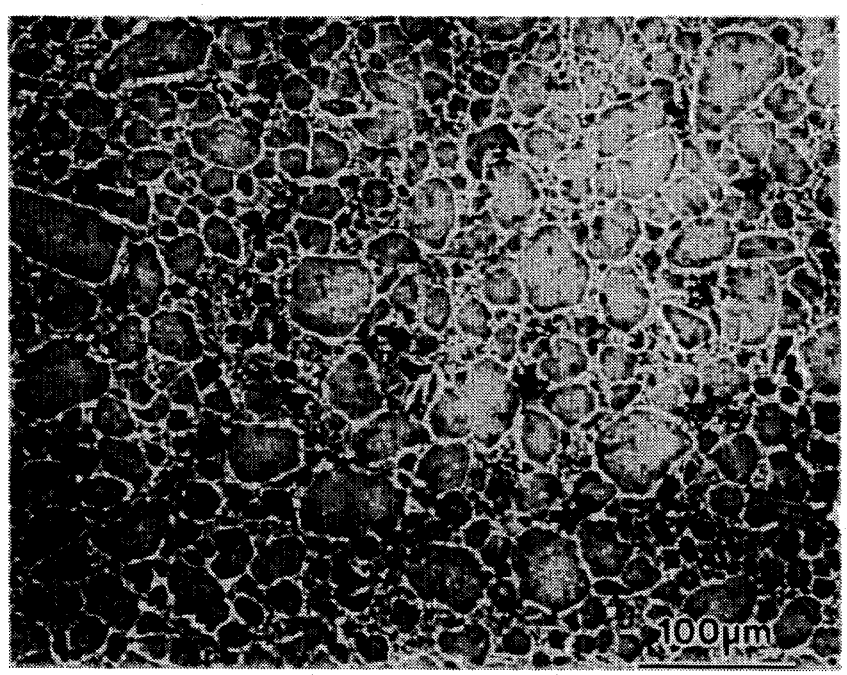
FIG. 7 is an optical micrograph showing the microstructure of a compacted copper-tungsten composite consisting of a bimodal distribution of tungsten particles.

The particle size of the particulate substrates can be chosen so as to maximize the packing fractions of the powders. For example, in applications involving consolidated three dimensional structures, particle size distribution is particularly important. It has been well established that a bimodal distribution of particle sizes can yield before pressing up to 83% by volume packing fraction. This is contrasted with a monomodal distribution of particle sizes (as close packed spheres) of only 73% packing fraction. Because of the buoyancy issues associated with small diameter particles in this fluidized bed application, it is sometimes preferable to use alternative coating techniques such as immersion deposition using the coating container of the present invention to coat the smallest of these particles. An example of a copper-tungsten microstructure consisting of a fluidized bed coated tungsten particle (originally 28 micron) coated with copper, blended with an immersion plated tungsten particle (originally 2.5 micron) plated with copper, is shown in FIG. 7.

In the electrochemical coating method of this invention, the material deposited on the particulate substrate may be any material that can be deposited electrochemically onto the surface of a substrate. Such coating materials include metals, alloys, non-metals, polymers, and ceramics. Metals and alloys may be deposited on substrates electrolytically. Non-metals, polymers, and ceramics may be deposited electrophoretically with the use of surfactants.

The electrolyte may be an aqueous solution, an organic solution, or a fused salt solution. Preferably, the electrolyte is an aqueous solution which contains ions of the metals to be coated onto the particulate substrates just previously discussed. Metal ions useful in this invention include any metal ion capable of reduction to its zero oxidation state, or elemental state, in an electrochemical deposition cell. Preferred metals include copper, silver, gold, iron, cobalt, nickel, and aluminum. The salts of these metal ions used in the electrolyte may include any anion which does not produce adverse results in the coating process or the coated particulates produced therefrom. Examples of such salts are sulfate salts, nitrate salts, cyanide salts, phosphinate salts, and pyrophosphate salts. Cyanide salts are preferred in dental restoration applications where, for example, intermetallics are coated with silver. Pyrophosphate salts are preferred in thermal applications where, for example, tungsten is coated with copper. The electrolyte may further include more than one metal ion so that an alloy, rather than a single metal species, will be deposited. In addition to the metal ions, the electrolyte may contain other salts, such as $Na^+$, $K^+$, $SO_4^{2-}$, $NO_3^-$, $CN^-$, $Cl^-$, and $P_2O_7^{4-}$ containing salts, and buffers such that the pH of the electrolyte is optimal for the deposition being conducted.

The fluidized bed electrochemical coating apparatus used in the present invention employs two component devices, a vibratory device to create a fluidized bed of particles and an electrochemical deposition cell. An element which links or is common to both of these components is a container in which the particulate substrate material (typically in powder form) and electrolyte are placed and in which electrochemical coating of the particulate substrate occurs.

An embodiment of a vibratory device used to create a fluidized bed of particles is shown in FIG. 1. The vibratory device 10 includes a container 20 attached to an actuator or vibrator 11 which is associated with a transducer 12, such as a piezoelectric transducer, and together the actuator 11 and the transducer 12 provide the necessary vibratory motion to the container 20 to create a fluidized bed. The preferred arrangement of the vibratory device, as shown in FIG. 1, illustrates how the actuator 11 is placed above the container 20 and is attached to the container 20 through a shaft 13 which extends along the central axis of the container 20, perpendicular to the base of the container.

The container 20 may be made from any material which does not substantially react with the electrolyte. The container 20 may also be electrically conductive, since the container, which is also a component of the electrochemical deposition cell, operates as the cathode contact during coating processes in which an external electric potential is applied. Typical materials are stainless steel, titanium, or platinized titanium. Alternatively, the container 20 may be made from graphite or silicon carbide.

The container 20 may be of any shape and size provided it is large enough to completely contain the particulate substrate and the electrolyte. The container includes at least one side wall or outside rim which extends between the top of the container and a base of the container. The side wall or outside rim and the base are imperforate, thereby preventing the particulate substrate from flowing out of the container 20. The top of the container may be open, such as in those embodiments where the entire container is immersed in a larger receptacle containing the electrolyte, or the top of the container may be closed, such as in those embodiments where the electrolyte is contained entirely within the container.

A preferred geometry is a circular container, except in those situations and with a particular embodiment of the container where controlled and continuous removal of particulates may be desirable (such as in removal of trace metals from waste streams). The diameter of a circular container may be of any suitable size for the apparatus used and volume of coated substrate particles being prepared. Typically, this is from about 15 to about 80 cm, depending on the nature of the actuator 11. Vibratory motion of a circular container involves simultaneous linear (vertical) and angular agitation of the container 20, resulting in the particulate substrate material forming a circular fluidized bed.

Alternatively, the container may be rectangular. In this embodiment, vibratory motion is linear (vertical and horizontal). The resultant effect is translational movement of the fluidized bed of particles which causes the particles to move from one end of the container to the other. Such an arrangement would provide for continuous electrochemical deposition of coatings onto particulate substrates.

Figure 2:
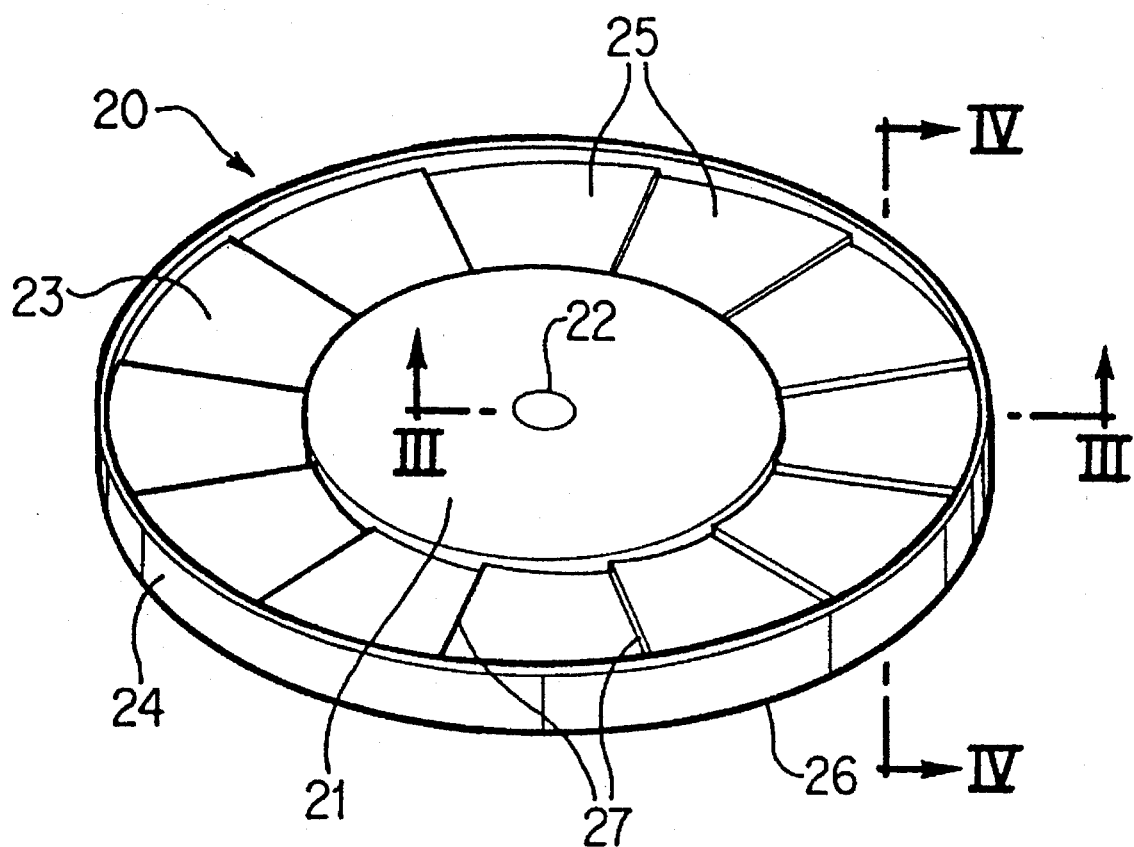
FIG. 2 is a perspective view of the fluidized bed container of this invention.

FIG. 2 shows a perspective view of a preferred embodiment of the container 20. The container 20 is circular and includes a center portion 21 surrounding the center axis 22 of the container, which in turn is itself surrounded by an annular recessed portion 23 which acts as the path over which the fluidized bed of particles travels. The latter is defined by the center portion 21 and a side wall or outside rim 24. The particulate substrate is retained in the annular recessed portion 23 during generation of the fluidized bed and during the electrochemical coating process. The base 26 of the recessed portion 23 may be flat or the base 26 may consist of a series of sloped, stepped segments 25 as shown in FIG. 2.

Figure 3:
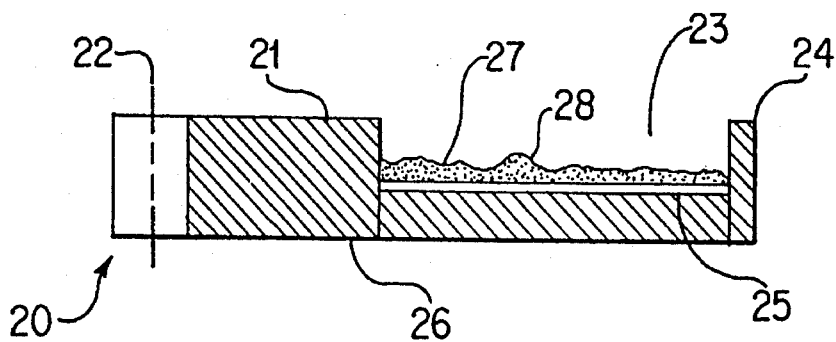
FIG. 3 is a cross-sectional view taken along line III—III of the fluidized bed container shown in FIG. 2.
Figure 4:
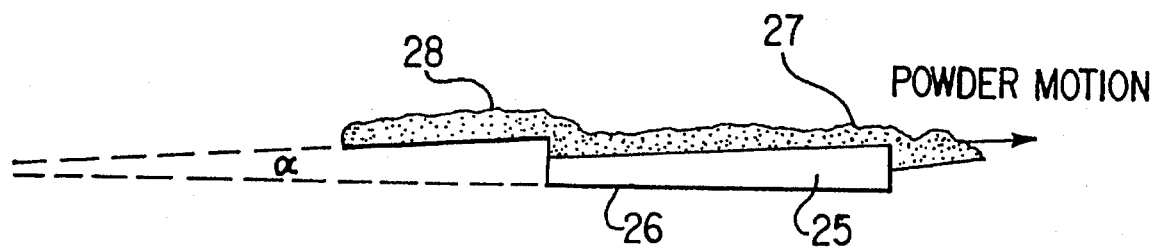
FIG. 4 is a cross-sectional view taken along line IV—IV of the fluidized bed container shown in FIG. 2.

The sloped, stepped segments 25 are located within the circumference and rim 24 of the circular container 20 and are shown more clearly in FIGS. 3 and 4. FIG. 3 is a cross-sectional view of the circular container 20 shown in FIG. 2 taken along line III—III. FIG. 4 is a cross-sectional view taken along the line IV—IV of the container 20 shown in FIG. 2. The cross-section is taken perpendicular to the view in FIG. 3, through the recessed portion 23 and the sloped segments 25, viewed from the center axis 22 of the container 20 toward the perimeter of the container.

The angle of inclination of the sloped, stepped segments 25 is the angle defined by a plane passing through the base 26 of the container 20 and a line extending along the surface of a sloped segment 25 when viewed in cross-section away from the center axis 22. This angle is denoted e and is shown particularly in FIG. 4. The angle of inclination is chosen so that a fluidized bed of particles may be most readily obtained in which the dispersion of the particles in the bed is approximately uniform. Other factors which affect the angle of inclination include the volume and particle size of the particulate substrate, the size of the container, and the number of sloped segments. The angle of inclination may be in the range from about 0 to about 10 degrees, preferably in the range from about 0 to about 3 degrees.

Furthermore, the sloped segments 25 may be disposed such that the top edge 27 of the sloped segment 25 is parallel to the plane formed by the base 26 of the container 20, as in the embodiment illustrated in FIG. 2, or the top edge 27 of the sloped segments 25 may be angled. The sloped segments 25 may be angled inwardly toward the center axis 22 of the container 20. This angle is the angle defined between the base 26 of the container 20 and the line formed by the top edge 27 of the sloped segment 25 from the outside rim 24 to the center portion 21. This angle preferably ranges from about 0 to about 10 degrees. FIG. 3 shows an embodiment of the invention where the angle between the base 26 of the container 20 and the top edge 27 of the sloped segment 25 is 0 degrees.

The number of sloped segments used depends on the nature of the actuator 11, the size of the container 20, the amount of particulate substrate material being coated 28, and the specific coating application. Typically, there are between about four and about twenty sloped segments equally spaced within the circumference of the circular container 20 in the annular path taken by the fluidized bed of particles.

The deposition method of the present invention for uniformly coating particulate substrate materials with various coatings generally involves immersing the particulate substrate in an electrolyte within an imperforate coating container, which may be electrically conductive, vibrating the container to generate a fluidized bed of particles in the electrolyte, and electrochemically depositing a coating on the particulate substrate. Electrochemical deposition usually involves deposition of metal ions from the electrolyte onto the surface of the particulate substrate material in the fluidized bed.

Figure 5:
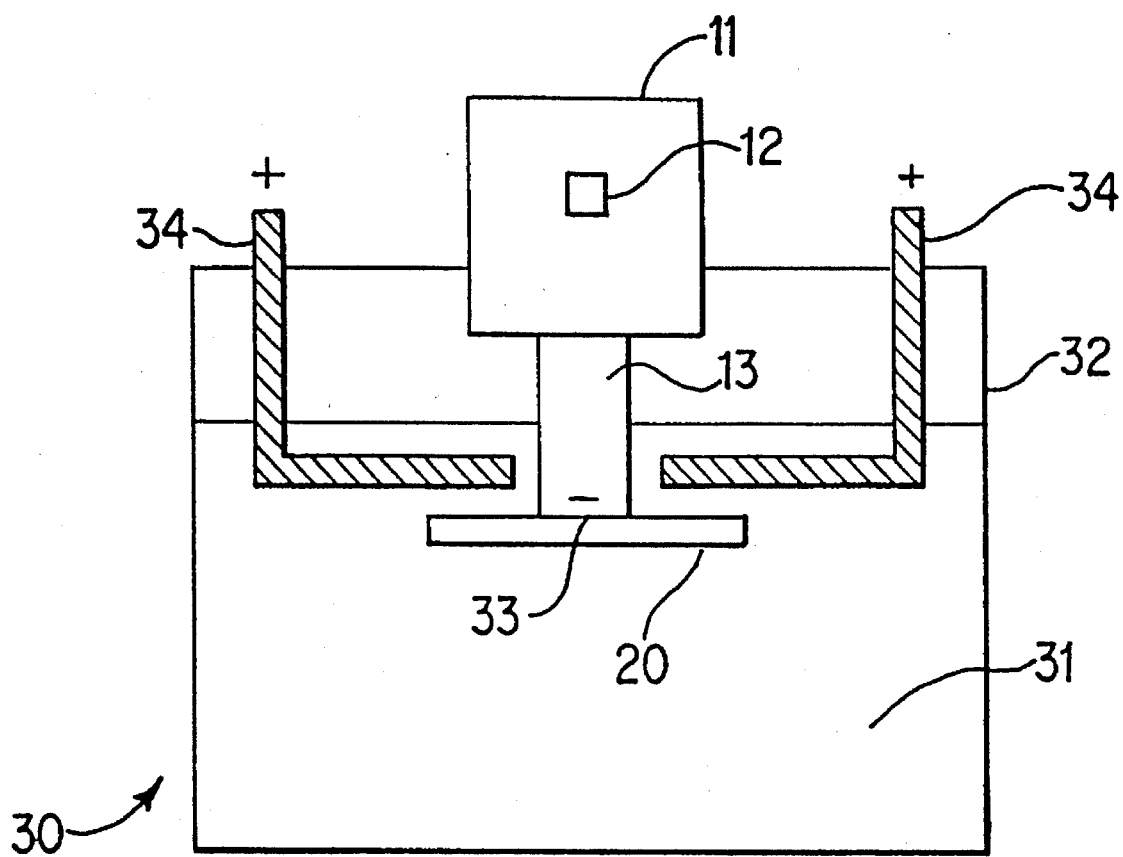
FIG. 5 is a schematic view of an electrochemical deposition cell of this invention.

The particulate substrate in the coating container is immersed in the electrolyte. If the container is configured so that it is large enough to hold both the particulate substrate and sufficient electrolyte to accomplish deposition, the electrolyte may be added to the container directly. A preferred embodiment is shown in FIG. 5 which is a schematic of a typical electrochemical deposition cell 30 of the present invention. The container 20 holding the particulate substrate is completely immersed in the electrolyte 31 which itself is contained in a receptacle 32.

The receptacle 32 is used to hold the electrolyte 31 into which the container 20 is immersed and should be of a sufficient volume to readily accommodate the electrolyte 31 as well as the coating container 20. The bulk of the electrolyte 31 may be either contained in this receptacle 32 or pumped into it from a separate reservoir. The receptacle 32 should be made from a material which will not substantially react with the electrolyte. The receptacle 32 may be made from stainless steel, titanium, or a suitable polymer, such as polypropylene.

Prior to immersion in the electrolyte, the surface of the particulate substrate material may be cleaned by treatment with an activating solution. This treatment removes any oxide layer that may have formed on the surface. This deoxidation step is particularly important with materials that possess a tenacious surface oxide layer, an oxide layer that is difficult to remove and which could interfere with the deposition process and the properties of the subsequently coated material. If necessary, a degreasing agent may be used to clean the surface of the particulate substrate material as well.

The activating solution may be any solution capable of removing an oxide layer from the surface of the particulate substrate materials, resulting in the surface of the substrate being "activated" for subsequent coating. Preferably, an aqueous activating solution containing from about 2 to about 15% fluoroboric acid is used. The activating solution useful for applications using tungsten substrate particles contains about 10% fluoroboric acid, while for applications using silver particles, the activating solution contains about 3% fluoroboric acid. Additionally, a complexing agent such as sulfamic acid also may be used in the activating solution.

While immersed in the activating solution, the material is agitated for a period of time, typically at least about 30 seconds, in order to remove the oxide layer from the surface of the particulate substrate. The activating solution is then separated, for example, by decanting or filtering, from the particulate substrate which is rinsed with water, preferably deionized water, to remove residual activating solution.

Treatment with activating solution may be performed in the container 20 itself or in a separate treatment container before placing the particulate substrate in the fluidized bed container 20. If treatment with the activating solution is conducted in the fluidized bed container 20 itself, after separation of the activating solution, rinsing may be effected by immersing the particulate substrate and the coating container 20 in a separate receptacle containing water.

The particulate substrate material, whether treated with an activating solution or not, is placed in the container 20 and immersed in the electrolyte 31 as described above. The container is attached through a shaft 13 to the actuator 11 which is associated with a transducer 12. As shown in the embodiment of FIG. 5, the actuator 11 is suspended above the electrolyte 31.

A fluidized bed of the particulate substrate material is generated. Known devices for generating fluidized beds employ air, inert gas, or liquid agitation by pumping the fluid through the bed of particles. The device for generating the fluidized bed in the present invention preferably uses mechanical agitation. Most preferably, the vibratory device shown in FIG. 1 and described above and in the examples below is used to generate the fluidized bed.

The container 20 undergoes mechanical, vibratory motion created by the vibratory device, such as shown in FIG. 1. The actuator 11 and the transducer 12, provides angular and/or linear agitation of the container 20. Alternatively, the transducer 12 may be replaced by an electromechanical arrangement, such as an electric motor coupled to a shaft or flywheel having an off-center weight, or by any device for generating a fluidized bed which effectively distributes the particulate substrate such that the particles are readily and continually dispersed in the electrolyte. Such alternate devices may employ pneumatic, sonic, or ultrasonic agitation.

Figure 6:
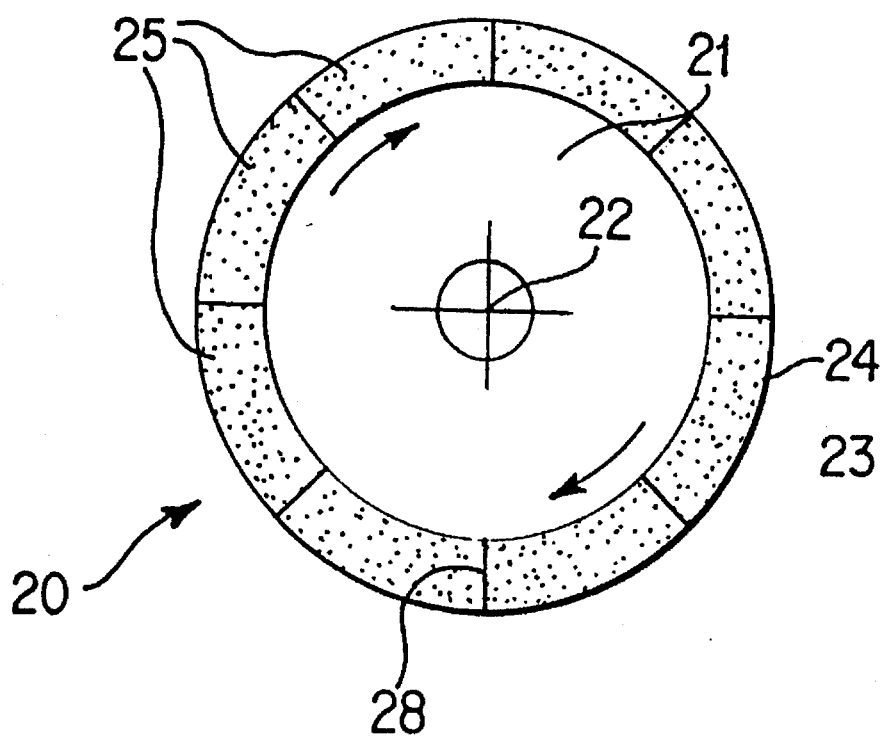
FIG. 6 is a top view, in use, of the fluidized bed container of the invention, the direction of motion of the fluidized bed of material shown by the arrows.

The container 20 undergoes vibratory motion caused by the transducer 12 such that the particulate substrate continually moves in the direction of the arrow shown in FIG. 4, from the bottom of a sloped segment 25 to the top edge of the segment 27, and then falling to the base of the next sloped segment, forming a fluidized bed. In an embodiment using a circular container such as that shown in FIGS. 2 to 4, the transducer 12 provides simultaneous linear and angular agitation of the container 20 such that the particles move circularly around the circumference of the container. In a rectangular container, the transducer 12 provides only linear agitation (both horizontally and vertically) of the container 20 producing translational movement of the particulate substrate. The substrate particles may be introduced at one edge of the rectangular fluidized bed container and removed at the opposite edge. FIG. 6 is a top view of a preferred circular container 20 viewed down the center axis 22, the arrows showing the circular direction of motion of the fluidized bed of particles.

During fluidization, the motion of the particulate substrate should be maximized. Two adjustable parameters, associated with the actuator 11, which control agitation, are frequency and amplitude. The appropriate parameters are selected empirically by observing which combination of parameters provides the most agitation. The frequency ranges from about 20 hertz to about 5 kilohertz. The vibratory motion which generates the fluidized bed suppresses agglomeration of the particles during the deposition process. The use of sloped, stepped segments may be used to further minimize agglomeration, allowing more efficient, uniform, and complete coating of the particles. In addition, fluidization creates a dense bed of particles and provides for intimate electrical contact of the particles with each other and with the container during deposition. Finally, the continuous movement of the particles in the fluidized bed enhances mass transport of the reactants in the electrolyte to the surface of the particulate substrate being coated.

While agitation continues, creating the fluidized bed of particles, electrochemical deposition of the coating commences. An external electric current is applied to the electrolytic deposition cell 30 shown in FIG. 5. Current densities depend on the coating application, ranging from as low as about 0.1 A/dm$^2$ for copper coatings to as high as about 1.0 A/dm$^2$ for silver coatings. The potential or current is applied to the cell through the connector 12 which attaches the fluidized bed coating container 20 to the actuator 11. The potential is conducted to the material to be coated from the base of the fluidized bed container 20. The source of or device for applying an electric potential to the electrochemical deposition cell 30 may be any source or device commonly used or known to provide an electric potential in an electrochemical deposition cell. Deposition may be potentiostatic (where the potential is kept constant with respect to a reference electrode) or galvanostatic (where the current is maintained constant independent of the electrolyte composition). The necessary applied current is governed by various factors including the surface area of the material being plated, the concentration of the coating material in the electrolyte, and operating parameters such as temperature, degree of agitation, etc. The container 20 itself is provided with appropriate electrical connections to operate as the cathode 33 in the electrochemical deposition cell 30 shown in FIG. 5.

The cathodic reaction is believed to occur predominantly at the top portion of the fluidized bed of particles. While not wishing to be held to a particular theory, it is believed that a concentration gradient of the metal ions in the electrolyte exists in the fluidized bed such that the concentration of metal ions at the bottom of the bed is lower than that at the top of the bed due to mass transfer limitations. As described above, the container 20 is made from any material that will not substantially react with the electrolyte 31. As a result of these phenomena, no plating takes place on the cathodic surface of the container 20.

The fluidized bed motion of the particulate substrate material avoids agglomeration of the particles. The fluidized bed substantially maintains electrical contact of the substrate and coated substrate particles with the cathodic surface of the container. Since the container is imperforate, a contact exists between the particulate substrate and the entire cathodic surface of the container 20. This is in contrast to a container which is perforated and can only maintain point electrical contacts with the substrate being coated. Area contacts, as provided in this invention, improve coatability in terms of uniformity and ease of deposition. Thus, during the deposition process, the predominate electrochemical reaction is reduction of metal ions in the electrolyte, resulting in coating the surface of the particles of the fluidized bed. As the particles continually move in the fluidized bed, they eventually become completely coated.

When lighter (less dense) particles are being coated, the cathode may be modified to include a membrane which constrains the lighter particles near the cathode surface. This arrangement is termed a sandwich cathode and prevents the lighter particles from being lost to the bulk electrolyte during fluidization.

The anode 34 (shown in FIG. 5) may be made from any conductive material commonly used in electrochemical deposition reactions including metals such as platinized titanium or non-metals such as graphite. Preferably, the anode is made from the metal to be coated on the particulate substrate. For example, if silver is to be coated on the particulate substrate, the electrolyte contains silver ions and the anode is made of silver metal. The anode 34 may have various configurations. The anode 34 may be immersed in the electrolyte 31 and suspended above the container 20 or alternatively it may be placed vertically surrounding the container 20 and extending into the interior of the receptacle 32 in the electrolyte. The anode configuration most desirable is that in which the anode 34 is suspended horizontally above the container 20 as shown in FIG. 5. This configuration ensures a uniform current distribution across the fluidized bed, resulting in more uniform coating thickness.

For some applications, the temperature of deposition might be required to be above ambient temperature (about 25° C.) for optimal plating conditions. The required temperature varies with the electrodeposition being performed. For example, when tungsten particles are to be coated with copper, the temperature of the electrolyte during the deposition process preferably ranges from about 45° to about 55° C. In such circumstances, appropriate temperature modification techniques would be employed. The temperatures used in this invention correspond to accepted practice for electrochemical deposition.

The electrochemical deposition is allowed to proceed for a period of time during which the individual substrate particles are completely and uniformly coated such that the coating thickness follows the surface roughness of the particles. Using an external electric current, the current is applied to the electrochemical deposition cell 30 and the metal ions in the electrolyte are reduced and plate onto the surface of the particles within the fluidized bed which has been generated. The duration of deposition determines the thickness of the coating. The amount of coating desired depends upon the application. The thickness of the coating depends on a number of factors including the total amount of charge passed through the cell, the current efficiency, the time of deposition, the degree of agitation, mass transport, and the kinetics of the reaction.

Once the deposition has proceeded for a period of time and the desired coating thickness has been achieved, the application of the external electric potential is discontinued. The coated particles are removed from the electrolyte 31 by either decanting the electrolyte or transferring the coated material and the fluidized bed container 20 to a different receptacle. The coated material is rinsed with water, preferably deionized or distilled water, alone or with a water/ methanol composition to facilitate drying. Drying of the coated materials may be accomplished at room temperature or may be accelerated by placing the wet powders in a hot air or nitrogen stream while in the fluidized bed container. Avoidance of an oxide layer on the surface of the particles is the primary consideration in determining the appropriate drying technique.

Although preferred is electrolytic deposition as discussed above, alternate methods may be used. In an alternate embodiment, using the fluidized bed container of the present invention, the particulate substrate may be coated using immersion deposition techniques wherein the particles are immersed in an electrolyte without the application of an external electric current. The particles are placed in the container, immersed in the electrolyte, and fluidized by the devices described previously to form a fluidized bed of particles. A particularly preferred immersion method is that described in United States Patent Application by D. S. Lashmore et al. entitled "Acid Assisted Cold Welding and Intermetallic Formation and Dental Applications Thereof", incorporated herein by reference filed concurrently herewith and having attorney docket number 4044-101 CIP. Immersion deposition requires that the coating metal be more noble (closer to gold on the electromotive series scale) than the particulate substrate material being coated. The driving force of the coating reaction using immersion deposition techniques is the dissolution of the surface of the particulate substrate material being coated. The enhanced mass transport of the metal ions in the electrolyte to the surface of the particles using the fluidized bed apparatus of this invention facilitates the immersion deposition process.

Coating may also be accomplished electrophoretically. Here, suspended or colloidal charged particles, usually ceramic particles, migrate to the surface of a substrate due to the effect of a potential difference across immersed electrodes. Ceramic particles may also be deposited anodically, where the potential across the electrodes is reversed. Further, the use of surfactants and other organic polymers may be employed in coating applications such as those associated typically with paint.

The coating process may also be accomplished using a combination of immersion deposition and electrolytic deposition coating techniques. In this embodiment, particulate substrate materials are first coated by immersion deposition. For example, the particles are placed in the coating container, immersed in the electrolyte, agitated to form a fluidized bed, and coated without application of an external electric current. After immersion deposition has proceeded for a period of time, the particulate substrate material is then coated by electrolytic deposition where an external electric current is applied to uniformly coat the particles to the desired thickness.

As an example, aluminum particles may be coated with copper according to the two step coating embodiment just described. Aluminum particles are placed in the coating container which is vibrated to form a fluidized bed of particles. The particles are immersed in an alkaline solution of copper phosphinate without application of an external electric current. An initial copper coating is deposited on the aluminum particles. After immersion deposition has been allowed to proceed for a period of time, for example about one minute, an external cathodic potential is applied. This electrolytic coating process continues until the desired thickness of copper has been deposited onto the aluminum particles.

The coated particles have utility in a wide variety of applications. The coated particles may be compacted under pressure to form a net shaped composite. Compaction may be accomplished by hot pressing, hot isostatic pressing, cold pressing, coining, forging, powder injection molding, or other standard powder metallurgy techniques. Because the particles have been completely coated by the metal, the coating itself acts as a spacer during compaction to keep the original individual particles (i.e. those before coating) separated. Further, there is no segregation of components of different densities during the compaction step as there would be if powders of copper and tungsten were simply physically mixed prior to compaction.

As an example, if copper coated tungsten is to be compacted into 100% dense parts, the copper coating must deform to fill up the free volume of the compressed parts. The free volume is that which would not be occupied by the original uncoated particles of tungsten if the tungsten particles were arranged in a close packed structure without further compression or compaction. In particular, assuming that the tungsten particles are spherical with diameters of 50 microns, the free volume is 25%. The copper coating would have to be 2.5 microns in thickness, assuming that all of the coating transformed to fill the free volume upon compaction.

Figure 8:
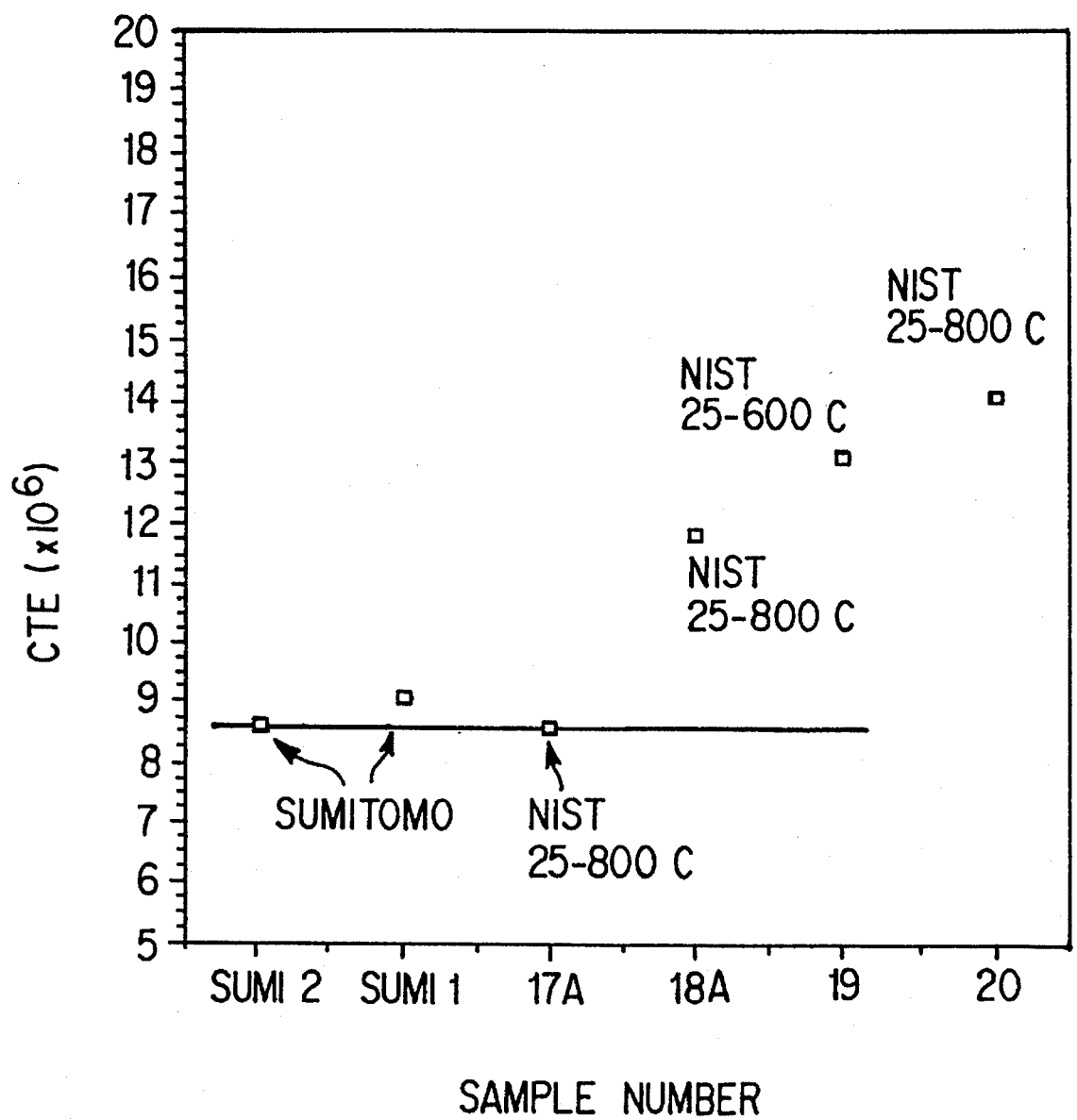
FIG. 8 is a graph comparing the coefficients of thermal expansion of various copper-tungsten composites with differing copper contents.

The electrochemical deposition method described in this invention, particularly employing the apparatus of the present invention, provides accurate control of the ratio of the coating thickness to the diameter of the particulate material to be coated. Even though this control is not on the atomic level and the thickness depends somewhat on the particle size of the material, accurate ratios of coating volume to particle volume are routinely accomplished within 1 or 2% of what was calculated. This degree of control allows the properties of the alloys produced by this invention to be accurately tailored over a wide range. Engineering properties of coated particles by controlling the relative volume fractions of the particulate material and the coating material is described in a copending patent application of one of the present inventors (Ser. No. 08/102,532, filed Aug. 4, 1993, which is a continuation of Ser. No. 07/731,809, filed Jul. 17, 1991), entitled "Methods of Manufacturing Particles and Articles Having Engineered Properties and Applying Coatings Having Engineered Properties to Articles", incorporated herein by reference. For example, the coefficient of thermal expansion can be varied from about $6 \times 10^{-6}$ cm/cm to about $17 \times 10^{-6}$ cm/cm so that the coefficient can be tailored to a suitable application. One such application is that of matching the coefficient of thermal expansion of a ceramic package to an aluminum heat sink or of even matching silicon to the aluminum heat sink. FIG. 8 shows a comparison of the coefficients of thermal expansion of various copper-tungsten composites with differing copper contents, demonstrating the flexibility and control the coating method and apparatus of the present invention allow for tailoring materials with specific thermal properties.

This invention provides for the fabrication of net shaped parts that were previously either impossible or too costly to produce because of the unavailability of appropriate coating techniques. Examples of such products include, but are not limited to, (1) shaped memory alloys such as titanium coated with nickel; (2) unique n-type semiconductors such as titanium coated with nickel and subsequently coated with tin; (3) materials with tailored or engineered thermal coefficients of expansion and good thermal diffusivity such as tungsten coated with copper or silver; (4) intermetallics for dental applications coated with silver, gold, or copper; and (5) materials with special magnetic properties such as unique magnetic signatures from iron coated with rhodium.

More specific embodiments of the invention are described in the following examples. While the invention has been described in detail with particular reference to preferred embodiments, it is understood that variations, modifications, and substitutions can be effected within the spirit and scope of the present invention.

EXAMPLE 1

Electrochemical Fluidized Bed
Deposition—Thermal Applications

Tungsten particles (50 g samples) with particle size nominally 28 microns were first cleaned by immersing them in an aqueous solution of 10% by volume of fluoroboric acid and then rinsing in deionized water.

The cleaned tungsten particles were coated with copper in an apparatus such as that depicted in FIG. 5. The electrolyte was an aqueous solution containing copper pyrophosphate (68 g/per liter of electrolyte solution), potassium pyrophosphate (275 g/liter), potassium nitrate (4.5 g/liter), and ammonium hydroxide (7.4 ml/liter). The pH of the electrolyte solution was adjusted to 8.2. The temperature of the electrolyte solution was maintained at $55° \pm 1°$ C. by a suitable temperature controller.

Tungsten particles were coated with copper using this electrolyte solution by placing the tungsten particles in a circular, stainless steel fluidized bed container with a flat recessed annular portion, immersing the tungsten particles in the electrolyte solution, suspending a platinized titanium anode in the electrolyte from above, generating a fluidized bed, and applying a current of 0.22 amps (for each 5 gram load of tungsten particles to be coated) for 8 minutes.

Following the plating process, the coated particles were decanted from the electrolyte, rinsed in deionized water, and then dried by flowing air at elevated temperature (at about 50° C.) over the particles. The dried particles were then pressed together to form a net shaped article using hot isostatic pressing. The resultant pressed article had a monomodal distribution of tungsten and a coefficient of thermal expansion in excess of $15 \times 10^{-6}$ cm/cm.

EXAMPLE 2

Electrochemical Fluidized Bed Deposition—Dental
Restoration Applications

Intermetallic particles of $Ag_3Sn$ or $Ag_4Sn$ (20 gram samples) of nominally 40 micron diameter were coated with silver using an electrochemical deposition cell such as that shown in FIG. 5. The particles were placed in the fluidized bed container of Example 1, with a flat recessed annular portion, and cleaned in an activating solution of 10% fluoroboric acid by agitating, followed by rinsing in deionized water. The container holding the wet, cleaned particles were immersed in the electrolyte. The electrolyte consisted of an aqueous solution of potassium cyanide (149.8 g/liter), potassium silver cyanide (67.4 g/liter), Techni-Silver E Make-up A (proprietary) (8.4 ml/liter), and Techni-Silver B (proprietary) (39.5 ml/liter). The pH of the electrolyte solution was adjusted to 10.

Figure 9A:
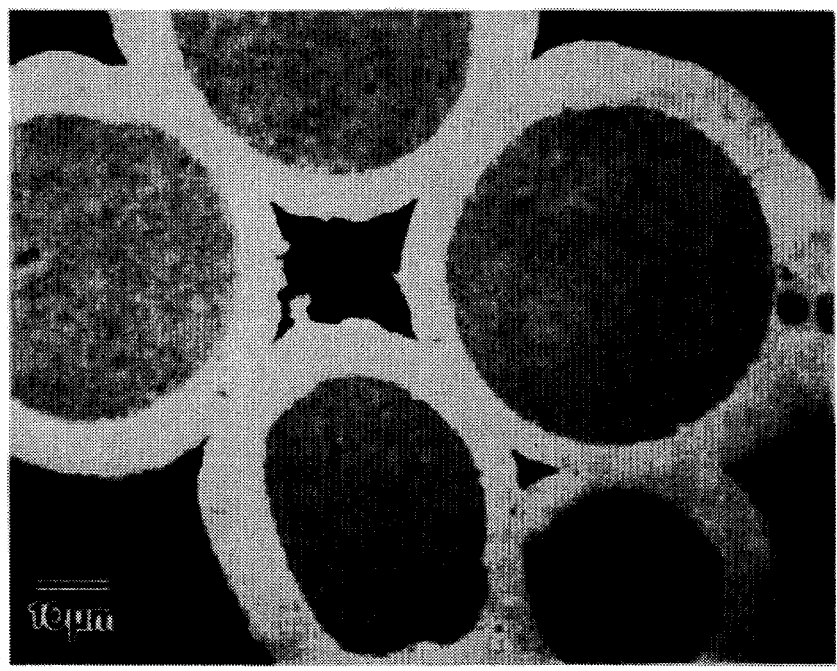
FIG. 9A is an optical micrograph of silver coated $Ag_3Sn$ particles produced using the fluidized bed process of this invention.
Figure 9B:
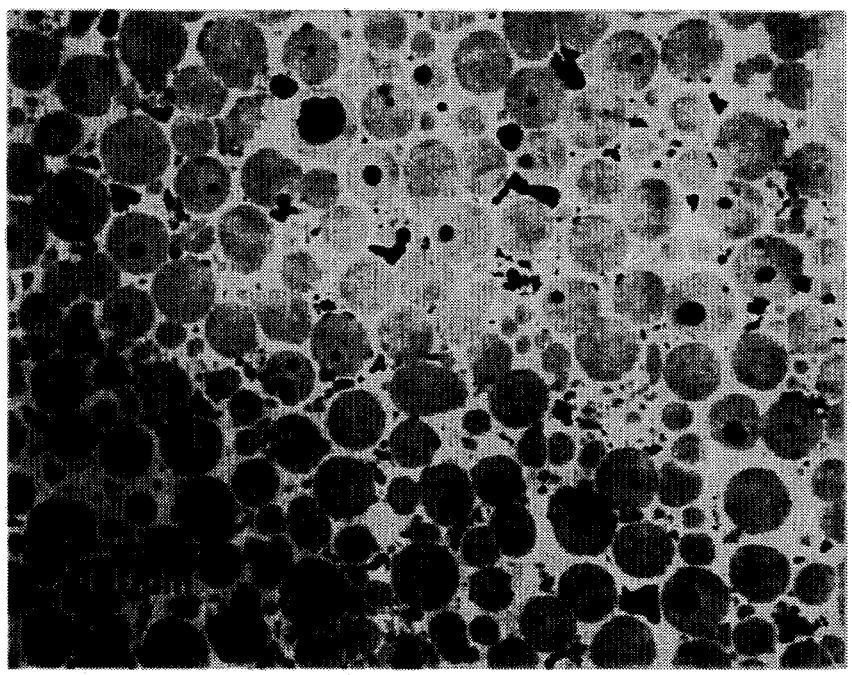
FIG. 9B is an optical micrograph of the silver coated $Ag_3Sn$ particles shown in FIG. 9A consolidated by cold pressing.

The fluidized bed was generated and plating occurred at ambient temperature with a current density of 0.2 A/dm$^2$. Plating continued until the resulting coating was 2 microns in thickness. The coated particles were cold pressed to green density of 88–92%. The optical micrographs in FIGS. 9A and 9B show the coated particles before and after cold pressing, respectively.

EXAMPLE 3

Copper Coated Tungsten Powder

Tungsten particles (50 gram samples) of nominally 28 micron particle size were first treated in an aqueous activating solution containing 10% fluoroboric acid, then rinsed with deionized water. The wet tungsten particles were placed in the fluidized bed container of the type shown in FIG. 2, which was then carefully immersed in a copper pyrophosphate electrolyte solution (composition same as in Example 1) in the receptacle of the electrochemical deposition cell as shown in FIG. 5. The temperature of the electrolyte solution was maintained at 55° C.

A fluidized bed of tungsten particles was generated by mechanical agitation. An electric current of 11 amps was then applied. This value roughly corresponded to a current density of 0.2 A/dm$^2$. The coating process continued until a total charge of 27,500 coulombs was passed through the cell. This corresponded to approximately 550 coulombs/gram or an approximate thickness of 1.5 microns on each particle. Once the plating process was complete, the coated powder was placed on a filter and rinsed with deionized water and dried in air. The coated particles were then pressed into a net shape.

EXAMPLE 4

Silver Coated Intermetallics

Using the same basic procedure described in Example 3, intermetallics ($Ag_3Sn$ or $Ag_4Sn$, 10 gram samples) were coated with silver. These intermetallics were not deoxidized in an activating solution of fluoroboric acid prior to plating because the surface oxides were soluble in the electrolyte solution itself.

The aqueous electrolyte had the following composition: silver cyanide (75 g/L) and potassium cyanide (90 g/L). The temperature of the electrolyte solution was 23° C.

An electric current of 3 amps was then applied. This value roughly corresponded to a current density of about 0.2 $A/dm^2$. The coating process continued until a total charge of 5000 coulombs was passed through the cell. This corresponded to approximately 500 coulombs/gram or an approximate thickness of 1.5 microns on each particle. Once the plating process was complete, the coated particles were decanted and dried.

EXAMPLE 5

Compaction of Coated Particles

Tungsten particles (2.5 micron average particle size) coated with copper by immersion deposition techniques were blended with tungsten particles (28 micron average particle size) coated with copper by the fluidized bed deposition method of this invention. The ratio of fluidized bed coated particles to immersion coated particles was 2 to 1 (by volume). The particles were cold pressed to 90% density and then hot isostatic pressed to 100% density. The coefficient of thermal expansion of this blended material was $7.8 \times 10^{-6}$ cm/cm. A cross-section of this compacted material is shown in FIG. 7.

We claim:

1. An apparatus for coating particles comprising:
   (a) an imperforate circular container for receiving particles to be coated and an electrolyte;
   (b) a device for generating a fluidized bed in said container, said device being operatively associated with said container, said device including a means for agitating said container; and
   (c) a device for passing a current through the electrolyte, said device comprising an electrochemical deposition cell including an anode, wherein said container is a cathode in said electrochemical deposition cell;
   (d) wherein said circular container includes a particle pathway comprising a recessed annular portion, wherein said recessed annular portion contains a series of sloped, stepped segments, said sloped, stepped segments having a surface and a top edge, said container including a base, said container having a center, said container terminating at an outside rim;
   (e) wherein the sloped, stepped segments are declined at an angle of declination of between about 0° and about 10° towards the center of the circular container, the angle of declination defined by a plane passing through the base of the container and a line formed by the top edge of the sloped segment drawn from the outside rim of the container to the center of the container, said angle of inclination being greater than 0.

2. An apparatus for coating particles comprising:
   (a) an imperforate circular container for receiving particles to be coated and an electrolyte;
   (b) a device for generating a fluidized bed in said container, said device being operatively associated with said container, said device including a means for agitating said container; and
   (c) a device for passing a current through the electrolyte, said device comprising an electrochemical deposition cell including an anode, wherein said container is a cathode in said electrochemical deposition cell;
   (d) wherein said circular container includes a particle pathway comprising a recessed annular portion; wherein said recessed annular portion contains a series of sloped, stepped segments, said sloped, stepped segments having a surface and a top edge, said container including a base, said container having a center, said container terminating at an outside rim;
   (e) wherein the sloped, stepped segments are inclined at an angle of inclination of between about 0 and about 10 degrees, the angle of inclination defined by a plane passing through the base of the container and a line extending along the surface of the sloped, stepped segments when viewed in cross-section away from the center of the container, said angle of inclination being greater than zero;
   (f) wherein the sloped, stepped segments are declined at an angle of declination between about 0 and about 10 degrees toward the center of the circular container, the angle of declination defined by a plane passing through the base of the container and a line formed by the top edge of the sloped segment drawn from the outside rim of the container to the center of the container.

3. An apparatus for coating particles comprising:
   (a) an imperforate circular container for receiving particles to be coated and an electrolyte;
   (b) a device for generating a fluidized bed in said container, said device being operatively associated with said container, said device including a means for agitating said container;
   (c) a device for passing a current through the electrolyte, said device comprising an electrochemical deposition cell including an anode, wherein said container is a cathode in said electrochemical deposition cell; and
   (d) a receptacle for an electrolytic solution, said container immersible in said receptacle.

4. An apparatus for coating particles comprising:
   (a) an imperforate circular container for receiving particles to be coated and an electrolyte;
   (b) a device for generating a fluidized bed in said container, said device being operatively associated with said container, said device including a means for agitating said container; said means for agitating said container including an actuator; and
   (c) a device for passing a current through the electrolyte, said device comprising an electrochemical deposition cell including an anode, wherein said container is a cathode in said electrochemical deposition cell;
   (d) wherein said circular container includes a particle pathway comprising a recessed annular portion; and
   (e) wherein said container is attached via a shaft to said actuator, said shaft suspending said container.

* * * * *